POWER OPERATING SYSTEM FOR TRACTOR HITCH LINKAGES

Filed Nov. 1, 1951 8 Sheets-Sheet 1

INVENTOR.
ERNEST V. BUNTING
BY
Carlson, Pitzner, Hubbard & Wolfe
ATTORNEYS

POWER OPERATING SYSTEM FOR TRACTOR HITCH LINKAGES

INVENTOR.
ERNEST V. BUNTING
BY
Carlson, Pitzner, Hubbard & Wolfe
ATTORNEYS

April 30, 1957 E. V. BUNTING 2,790,364

POWER OPERATING SYSTEM FOR TRACTOR HITCH LINKAGES

Filed Nov. 1, 1951 8 Sheets-Sheet 3

INVENTOR.
ERNEST V. BUNTING
BY
Carlson, Pitzner, Hubbard & Wolfe
ATTORNEYS

INVENTOR.
ERNEST V. BUNTING
BY
Carlson, Pitzner, Hubbard & Wolfe
ATTORNEYS

April 30, 1957 E. V. BUNTING 2,790,364

POWER OPERATING SYSTEM FOR TRACTOR HITCH LINKAGES

Filed Nov. 1, 1951 8 Sheets-Sheet 5

INVENTOR.
ERNEST V. BUNTING

BY
Carlson, Pitzner, Hubbard & Wolfe
ATTORNEYS

April 30, 1957 E. V. BUNTING 2,790,364

POWER OPERATING SYSTEM FOR TRACTOR HITCH LINKAGES

Filed Nov. 1, 1951 8 Sheets-Sheet 6

INVENTOR.
ERNEST V. BUNTING
BY Carlson, Pitzner, Hubbard & Wolfe
ATTORNEYS

INVENTOR.
ERNEST V. BUNTING
BY
Carlson, Pitzner, Hubbard & Wolfe
ATTORNEYS

April 30, 1957 E. V. BUNTING 2,790,364

POWER OPERATING SYSTEM FOR TRACTOR HITCH LINKAGES

Filed Nov. 1, 1951 8 Sheets-Sheet 8

INVENTOR.
ERNEST V. BUNTING
BY Carlson, Pitzner, Hubbard & Wolfe
ATTORNEYS

United States Patent Office 2,790,364

Patented Apr. 30, 1957

2,790,364

POWER OPERATING SYSTEM FOR TRACTOR HITCH LINKAGES

Ernest V. Bunting, Detroit, Mich., assignor to Harry Ferguson, Inc., Detroit, Mich., a corporation of Delaware Application November 1, 1951, Serial No. 254,305

35 Claims. (Cl. 97—46.07)

The invention relates to power operating systems for tractor hitch linkages having controls for automatically maintaining an attached implement at a uniform working depth, and more particularly to improved controls for such systems.

The invention is concerned primarily with systems of the above general character in which the controls are actuated in accordance with the ground reaction on the implement, that is, the resistance opposed to the forward movement of the implement in working engagement with the ground. The basic system utilizing that principle is disclosed in the Ferguson Patent No. 2,118,180 issued May 24, 1938. In that system the implement is connected to the hitch linkage in a manner such that the ground reaction tends to rock the implement forwardly. Such forward rocking is opposed by a control spring provided on the tractor and associated with controls for the power operated actuator including a control element shifted in response to changes in the draft load to initiate the raising or lowering of the linkage and attached implement to restore the system to a balanced condition. Thus the implement working depth as reflected by the draft load on the linkage is maintained substantially uniform.

In the system shown in the Ferguson patent, the response of the controls to changes in the draft load or, in other words, the sensitivity of the system, is determined by the characteristics of the control spring employed. The spring must, of course, be sufficiently powerful to oppose the extremely heavy loads imposed on it by implements such as plows where variations on the order of several hundred pounds occur when the implement is raised or lowered through relatively short distances. Other types of implements adapted for use with the same hitch linkage as, for example, cultivators, are subject to comparatively little ground reaction and consequently the variations in the force available for actuating the controls are quite small. Conversely, raising or lowering of the implement through substantial distances are required to effect corrective changes in the loading. Maintenance of uniform working depth, therefore, requires a much more sensitive response of the controls to draft variations than is afforded by the controls suitable for use with plows.

The provision of separate control springs for each type of implement affords no solution of the problem. One of the many problems involved in such an arrangement is that it is impractical since it is a laborious and time consuming operation. Efforts have been made to provide controls susceptible of adjustment to vary sensitivity without requiring a change of control springs. Such an adjustable control is disclosed and claimed in my earlier application Serial No. 97,640 filed June 7, 1949, now Patent No. 2,715,863. That control represents a substantial improvement over prior systems and enables the tractor power system to operate more efficiently with all types of implements adapted for use with the tractor. It has been found, however, that the efficiency of the system can be further improved by increasing the range of adjustment beyond that provided by the above mentioned controls.

With the above in view the invention has for its principal aim the provision of controls which have a much wider range of adjustment for sensitivity of response and which, in fact, may be adjusted instantly to provide precisely the right sensitivity for any type of tractor drawn implement and without in any way modifying or interfering with the normal operation of the manual controls provided in the system.

Another object is to provide controls for the power actuated hitch linkage system of a tractor which afford a very wide range of adjustment of sensitivity and which are so compact that they can be easily accommodated in the center housing of a conventional tractor.

Another object is to provide a novel mechanism for translating the movements of one control element to proportional movements of another control element, which mechanism is characterized by its wide range of adjustability and by the ease and accuracy with which the adjustment may be effected.

Another object is to provide an improved motion transmitting linkage embodying a novel collapsible thrust link which effectively prevents damage to the linkage or associated elements when subjected to forces tending to cause it to overtravel.

Still another object is to provide improved means for shutting off the power operating system for the draft linkage when the latter has been raised to an upper limit position.

A further object is to provide an improved arrangement for quickly and effectively actuating a safety valve associated with the pressure fluid operated actuator of a system of the above general character when an excessive load is imposed on the implement attached to the tractor.

It is also an object of the invention to increase the ruggedness and dependability of the control mechanism and to effect simplification of its construction to adapt it for commercial production.

Other objeces and advantages of the invention will become apparent from the following detailed description of the preferred embodiment illustrated in the accompanying drawings, in which.

For purposes of illustration a single preferred embodiment of the invention has been shown and will be described in detail herein. It is not the intention, however, that the detailed character of the disclosure should limit the invention, but on the contrary is intended to afford the greatest aid to the public in later constructing what now appears to be the most desirable form of the invention. It is may intention to cover all modifications and alternative constructions falling within the spirit and scope of the invention as it is more broadly and generally characterized in the appended claims.

The invention is closely associated with the hitch linkage provided on the tractor for the attachment of implements and with the power operating system associated with the linkage, and in effect constitutes a part of such power operating system. For convenience of description it has, therefore, been shown as incorporated in a tractor equipped with a hitch linkage, power operating system and other appurtenances which are either of well known and conventional construction, or are disclosed in other applications for Letters Patent. This associated apparatus will be described in some detail to afford a more ready understanding of the construction and mode of operation of the improved controls with which the present invention is primarily concerned.

*Tractor and hitch linkage*

Figure 1:
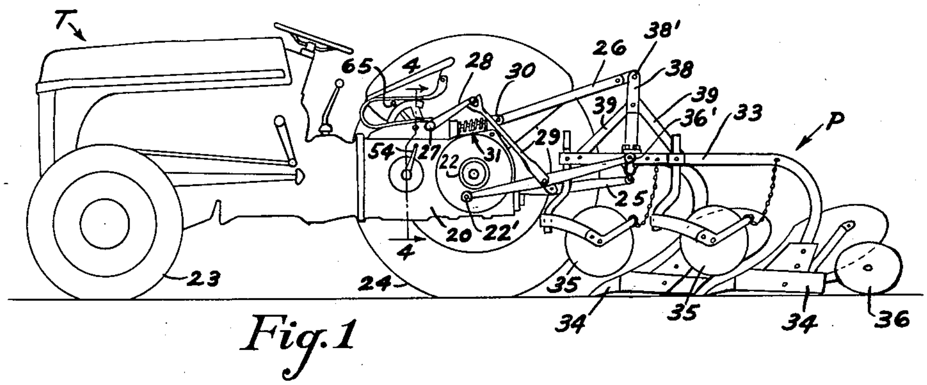
Figure 1 is a side elevational view of a tractor equipped with a power operated draft linkage actuating system embodying the features of the invention, a typical implement being shown as attached to the linkage.
Figure 2:
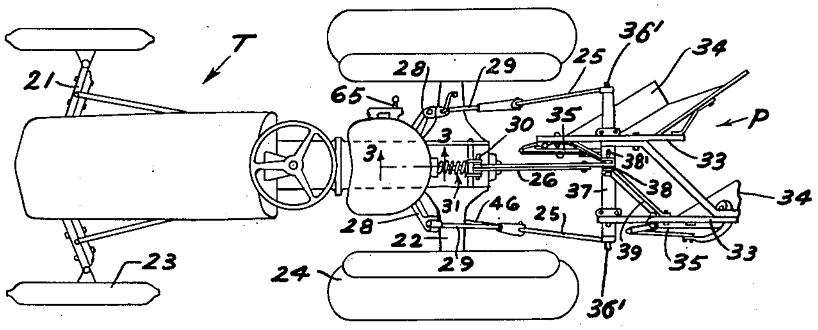
Fig. 2 is a plan view of the tractor and implement shown in Fig. 1.

Referring to Figs. 1 and 2 of the drawings, the tractor T with which the invention has been shown, has an elongated body or center housing 20, front and rear axles 21 and 22, front wheels 23 and rear wheels 24, the latter constituting the driving wheels. The exemplary tractor is equipped with a hitch linkage of the type shown in the Ferguson patent above referred to, comprising in this instance a pair of lower or draft links 25 and a upper or top link 26. The draft links are adapted to be raised or lowered by a power operated means on the tractor acting through a transverse rockshaft 27 on the tractor body having radially projecting arms 28 connected by drop links 29 with the respective draft links.

As will be seen by reference to Fig. 2, the draft links 25 are arranged in side by side relation and converge forwardly. Their front ends are pivotablly secured at 22' on the rear end portion of the tractor differential housing for swinging movement about a transverse horizontal axis located below and slightly forward of the rear axle 22 of the tractor. The pivot connections 22' permit lateral as well as vertical swinging of the draft links.

Figure 3:
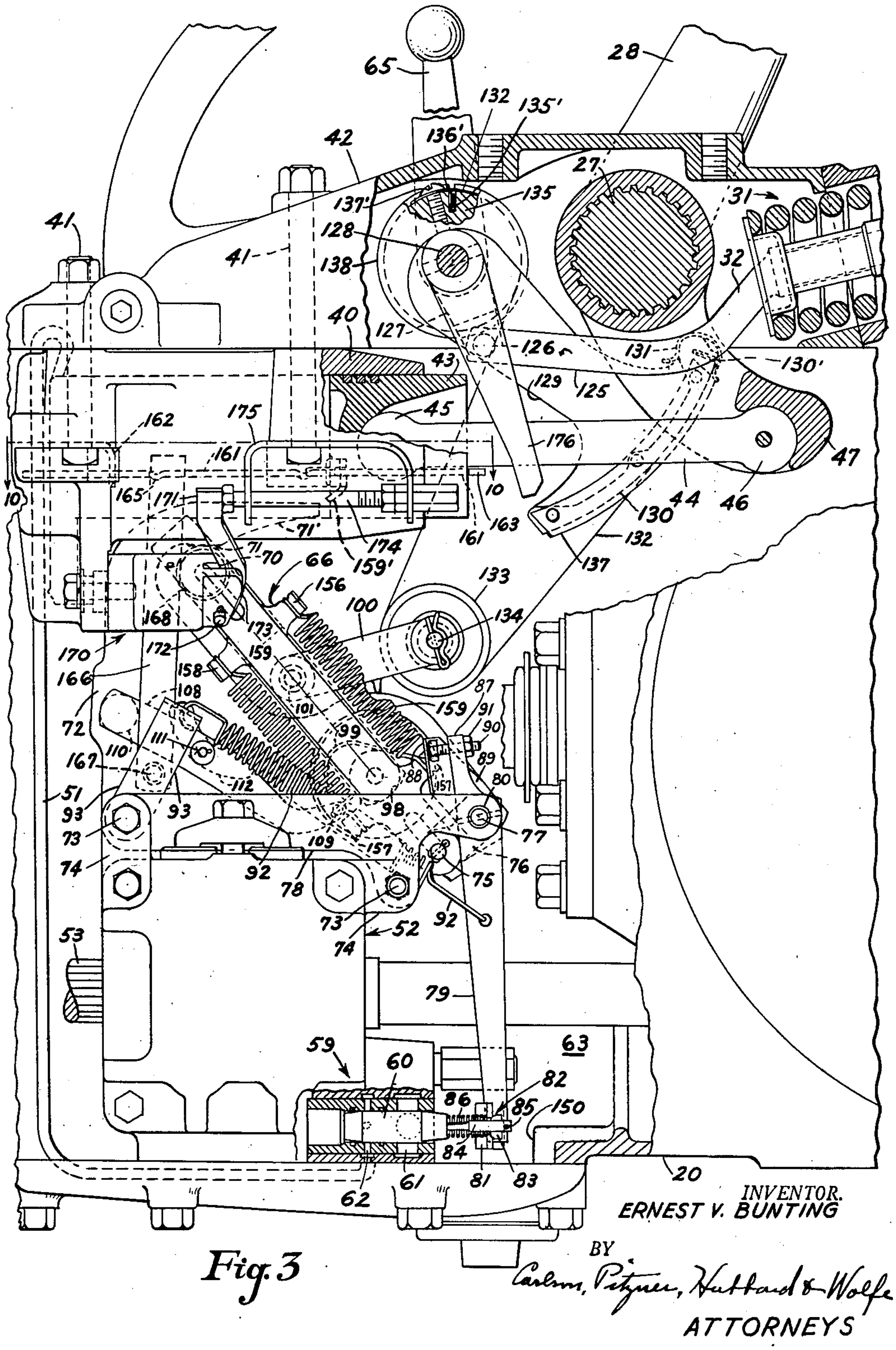
Fig. 3 is a sectional view through the rear portion of the center housing of the tractor which encloses the power operating system, the section being taken in a vertical plane substantially on the line 3—3 of Fig. 2.

The top link 26 of the hitch linkage is detachably universally pivoted at its forward end to the rearwardly projecting arm of a rocker or shackle 30 which has its other arm pivoted on the tractor body to swing fore and aft. Forward thrust in the top link tends to swing the shackle 30 forwardly, while tension on the top link tends to pull it rearwardly. Movement of the shackle in either direction is resisted by a control spring assembly 31 interposed between the tractor body and the shackle. A control element herein shown as a plunger 32 pivotally secured to the shackle for fore and aft movement therewith extends forwardly through the spring assembly and into the tractor center housing, as shown in Fig. 3, for cooperation with control mechanism to be described later.

In accordance with the usual practice, swivelly mounted balls are provided at the rear ends of the three hitch links 25 and 26, such balls being centrally apertured for the reception of connecting pins. By this means a three-point connection may be established with any desired ground working or other implement. By way of illustration, a two bottom moldboard plow P has been shown attached to the hitch linkage. The plow illustrated has two beams 33 each carrying a plow base 34 with an associated colter 35 and a rolling furrow wheel 36. The plow beams are rigidly mounted on a transverse member or drawbar 37 which has projecting pins 36' at opposite ends for engagement in the apertured balls of the draft links 25.

For connection with the top link 26 of the hitch linkage, an upright strut 38 is provided on the implement P, preferably substantially centrally of the drawbar. The top link 26 is universally pivoted at its rear end to the upper end of the strut as by a pin 38'. Diagonal braces 39 reinforce the strut and hold it rigid for the transmission of either compression or tension forces to the top link incident to the fore and aft rocking of the implement.

*Power operating system*

Figure 4:
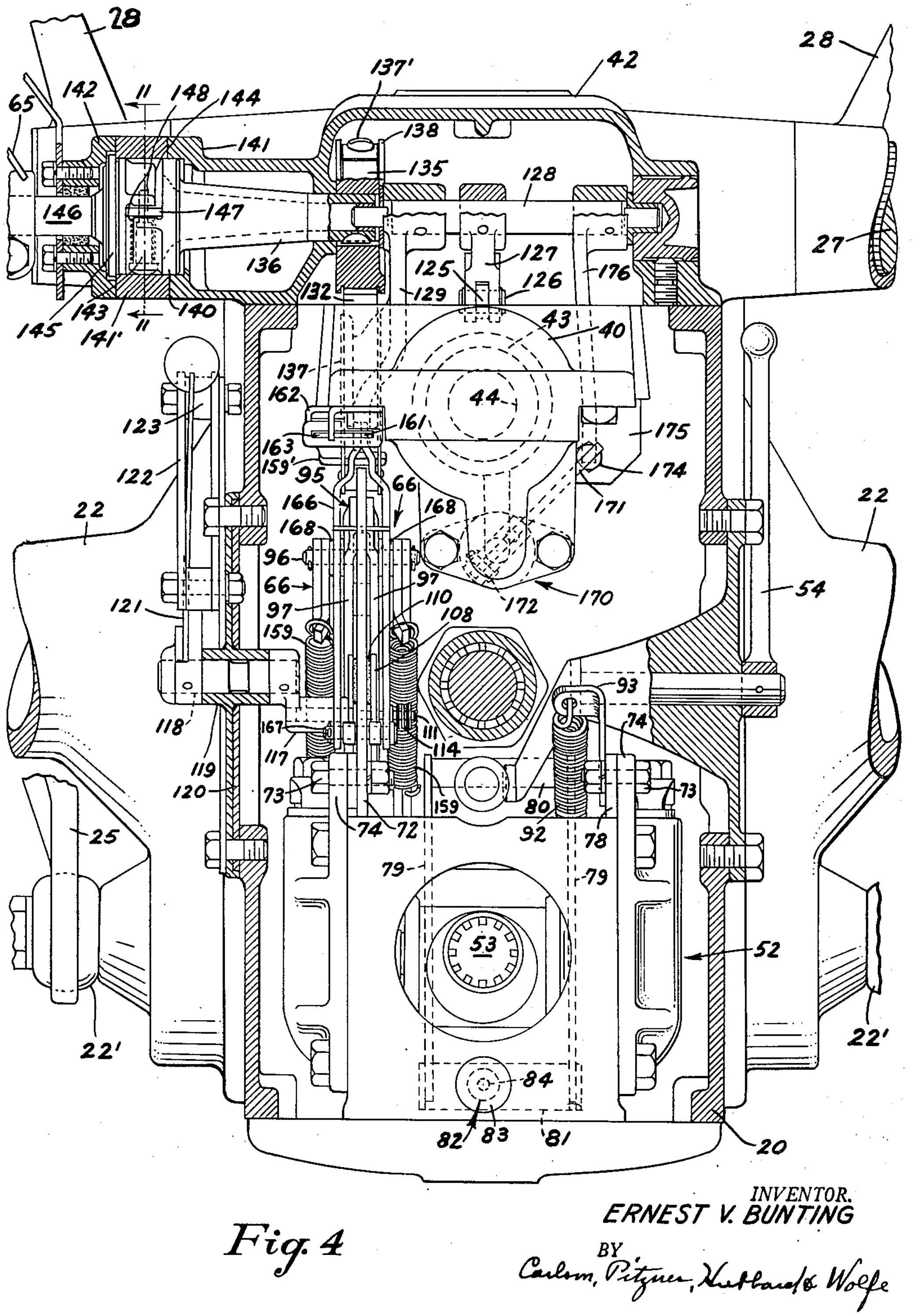
Fig. 4 is a transverse sectional view through the rear portion of the tractor center housing taken in a vertical plane substantially on the line 4—4 of Fig. 1.
Figures 10, 11, 12:
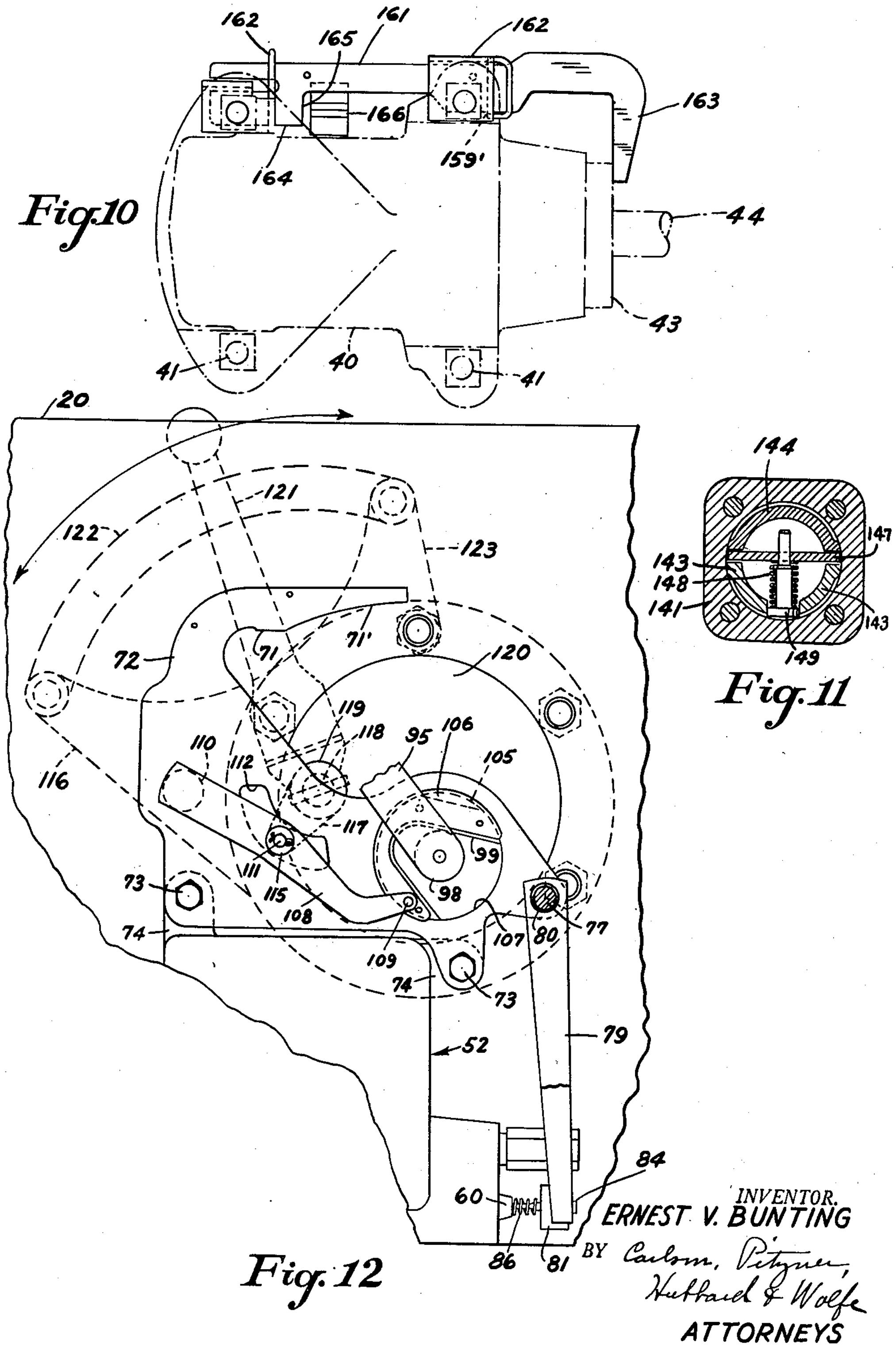
Fig. 10 is a plan view of the hydraulic ram constituting the power element of the hitch actuating system, together with certain of the control elements mounted on or in close association with the ram.
Fig. 11 is a sectional view taken in a vertical plane substantially on the line 11—11 of Fig. 4, showing details of the quadrant lever locking device.
Fig. 12 is a fragmentary side view showing details of the adjusting mechanism provided in the controls.

Raising of the hitch linkages and the attached implement is accomplished by the power operated means on the tractor which is preferably in the form of a hydraulic power unit. The power unit is enclosed within the center housing 20 of the tractor and, as shown in Figs. 3, 4 and 10, includes an actuator, herein shown as a one way ram comprising a cylinder 40 secured as by bolts 41 to a removable cover plate 42 which forms a part of the top wall of the center housing 20. The cylinder 40 opens to the rear of the tractor and working therein is a piston 43. Coacting with the piston is a piston rod 44 having a ball shaped forward end 45 received in a rearwardly opening socket in the piston and a ball shaped rear end 46 socketed in the lower end of an arm 47 rigid with the transverse rockshaft 27. In the exemplary tractor, the rockshaft is journaled in the upper portion of the cover plate 42.

With the arrangement illustrated, the admission of pressure fluid to the forward end of the cylinder 40 forces the piston 43 rearwardly to rock the shaft 27 counterclockwise and swing the crank arms 28 upwardly so as to raise the draft links 25. Upon exhaust of fluid from the cylinder 40 the piston 43 is permitted to retreat into the cylinder under the urging of the gravity load on the draft links and the implement attached to those links so that the latter swing downward in a lowering direction.

Pressure fluid such as oil is supplied to the actuator or ram cylinder 40 by way of a conduit 51 (Fig. 3) from a pump 52 (Figs. 3, 4, 8 and 12) powered from the tractor engine, the conduit being connected to the pump as shown, for example, in the Ferguson patent above referred to. The pump may be of any preferred type such, for example, as an eccentric driver multiple cylinder pump of the type shown in the Feguson patent hereinbefore referred to. The drive for the pump is preferably derived from the power takeoff shaft 53 of the tractor, which is driven from the tractor engine through a clutch (not shown) engaged or disengaged by means of a manually operable clutch actuating lever 54 carried on the side of the center housing 20, as shown in Figs. 1 and 4.

The supply of fluid to and exhaust of fluid from the ram cylinder 40 for raising and lowering the hitch linkage is desirably controlled by means of valve mechanism 59 associated with the intake side of the pump so that the pump may be driven continuously without recirculating fluid during idle periods of the system. In the exemplary embodiment, the valve mechanism as shown in Figs. 3, 12, 13 and 16, comprises a single sliding valve member or plunger 60 arranged to control a set of intake ports 61 for the pump 52 and a set of restricted bleed or drop ports 62 communicating with the conduit 51 leading to the ram cylinder 40.

In the neutral or "off" position in which the valve plunger is shown in Fig. 3, it blocks both the intake ports 61 and the bleed ports 62. Under such conditions any fluid in the ram cylinder 40 is locked therein and no additional fluid can reach the pump 52 for supply to the ram. Upon forward movement of the valve plunger 60 to its "raising" position (to the left as shown in Fig. 3), the pump intake ports 61 are uncovered admitting fluid to the pump from a surrounding sump or reservoir 63. The fluid thus admitted to the pump is delivered under pressure to the ram cylinder 40 by way of the conduit 51 and the piston 43 is accordingly shifted rearwardly to raise the draft links 25.

In its forward or "raising" position, the valve plunger 60 continues to block the bleed ports 62. When the plunger is shifted rearwardly or to its "lowering" position, the intake ports 61 are blocked but the bleed ports 62 are uncovered, thereby permitting fluid to exhaust from the ram cylinder to the sump 63. The restricted size of the ports 62 limits the rate at which fluid may escape and thus the rate of descent of the draft links and attached implement.

*Control mechanism*

Actuation of the control valve 59 of the power unit to maintain the implement attached to the hitch linkage at a predetermined working depth is effected by control mechanism acting automatically in accordance with the force exerted by the implement through the top link 26 tending to displace the control plunger 32 progressively from a neutral position against the force exerted by the control spring assembly 31. Such predetermined working depth is determined by the setting of a conveniently accessible manually operable control element in the form of a quadrant lever 65 (Figs. 1–4) arranged to coact with the other elements of the control mechanism in a novel manner.

In accordance with one major aspect of the invention novel means including a differentially movable thrust link 66 (Figs. 3–6) is provided in the control mechanism for transmitting the movements of the control plunger 32 proportionally to the valve member 60 in a ratio that can be varied to provide precisely the proper response for the particular implement attached to the tractor to effect such automatic control. That is to say, the rate of response of the valve member to changes in the ground reaction on the implement, or in other words the sensitivity of the mechanism, is selectively adjustable to enable the power operating system to maintain the implement at a substantially uniform working depth regardless of the differences in the reactive forces acting on different types of implements. Moreover, the construction and arrangement of the control mechanism is such that the adjustments of the sensitivity do not interfere in any way with the operation of the depth selecting control or quadrant lever 65.

In accordance with another aspect of the invention, the motion transmitting means of the control mechanism embodies novel features of construction which effectively prevent damage to the parts in cases where an actuating force is applied tending to impart excessive movement of the motion transmitting means. Other features of this mechanism more or less concerned with the safety of operation and each embodying novel structural and functional characteristics include means for automatically actuating a safety valve for dumping fluid from the actuator cylinder 40 under emergency conditions as when the implement strikes an obstruction. Provision is also made for automatically interrupting operation of the power unit when the implement is raised to an upper limit position, commonly known as the transport position.

As indicated above, the shifting of the valve plunger 60 is effected by the thrust link 66 which, in turn, receives increments of movement from the control plunger 32. Insofar as its plunger shifting function is concerned, the thrust link acts as a rigid member of fixed length. Accordingly, the features of construction which permit collapse of the link when a shifting force is applied in a manner such as to impart excessive movement thereto, may be passed over for the movement in considering its normal mode of operation.

Figure 5:
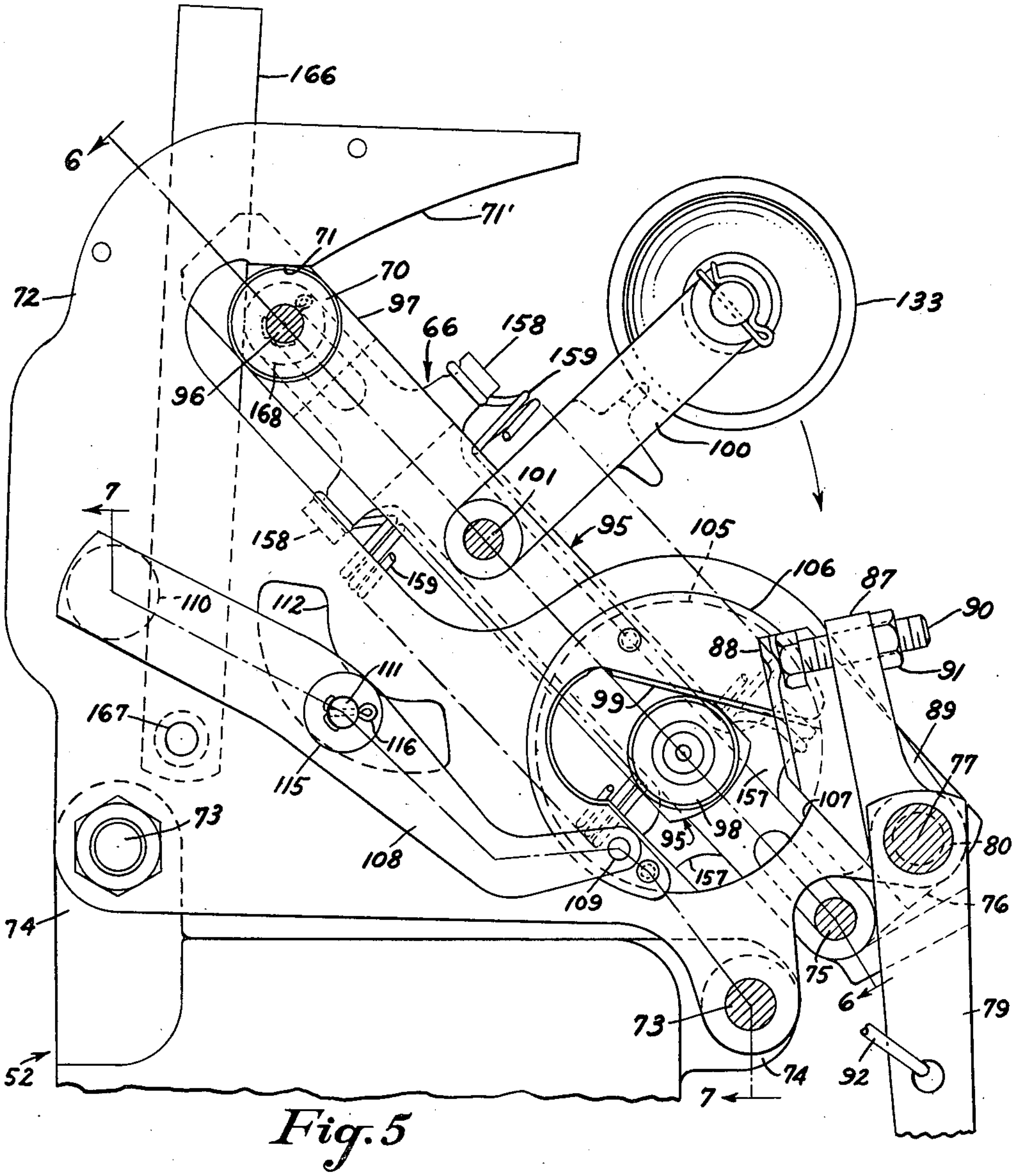
Fig. 5 is a view showing a part of the control mechanism in side elevation.

As will be seen by reference to Figs. 3 and 5 of the drawings, the link 66 is disposed in a rearwardly inclined position above the pump 52 and is provided at its upper end with a follower roller 70 adapted to ride on a cam track having a main section 71 disposed at an angle to the longitudinal axis of the link and an auxiliary section 71' extending rearwardly and upwardly from the first mentioned section. The cam track section 71 in this instance is substantially straight or flat and horizontal and is formed by the lower edge of a rearwardly projecting extension adjacent the upper end of a thin flat bracket or plate 72 mounted in an upright, edgewise position on the housing of the pump 52. As herein shown, the bracket 72 is secured to the pump by bolts 73 and lugs 74 integral with the pump housing.

Figure 8:
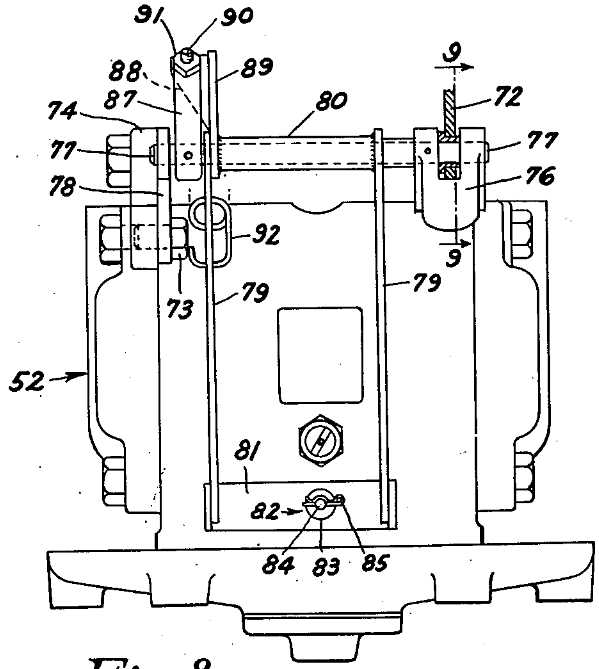
Fig. 8 is a fragmentary end view of the pump and elements of the control system mounted on or in close association therewith.

At its other or lower end the thrust link 66 is pivotally attached as by a pin 75 with one end of a crank arm 76 pinned or otherwise non-rotatably fixed on a cross shaft 77. As shown in Fig. 8, the shaft is journaled at one end in the plate 72 and at the other end in an upstanding bracket 78 mounted on the pump housing.

In the exemplary embodiment, the shaft 77 serves as a pivot for a valve shifter fork and has an adjustable one way connection therewith for transmitting the movements of the thrust link to the valve plunger 60. The shifter fork in its preferred form comprises a pair of laterally spaced parallel arms 79 rigidly secured at one end to a sleeve 80 rotatably mounted on the shaft 77. The other ends of the arms 79 are connected by a cross member 81 having a socket 82 for the accommodation of a ball shaped head 83 on a stem 84 projecting from one end of the valve plunger 60. The head is retained on the plunger by suitable fastening means such as a cotter pin 85 and a spring 86 (Fig. 3) interposed between the cross member and the adjacent end of the valve plunger maintains the head in the socket while permitting universal swiveling movement of the stem relative to the cross member.

The one way operating connection between the shifter fork and the shaft 77 is provided in this instance by an arm 87 rigidly fixed to the shaft so as to overlie a laterally projecting flange 88 formed on a finger 89 rigid with and projecting radially from the sleeve 80. Engagement between the arm 87 and the flange 88 is effected through a contact element in the form of a bolt 90 threaded into the arm and having its head positioned for engagement with the flange 88. Accordingly the angular position of the shifter arm with respect to the crank arm on the shaft may be easily and accurately adjusted by screwing the bolt into or out of the arm. A lock nut 91 on the bolt 90 may be provided for locking the parts in adjusted position. Spring means is provided for yieldably urging the shifter fork in a direction to open the valve ports 61 and thus admit fluid to the pump 52. The force of the spring is also transmitted from the shifter fork through the one way connection above described to the thrust link 66 tending to shift the link upwardly and forwardly. Such movement of the thrust link is limited by engagement of the cross member 81 of the shifter fork with the rear face of the pump housing, the valve plunger 60 in that case being shifted to full intake position. This spring means, as herein shown, is comprised of an elongated tension spring 92 having one end attached to one of the arms 79 of the shifter fork and the other attached to an upstanding bracket 93 rigidly secured to the pump housing.

Since the cam track section 71 is disposed at an angle to the longitudinal axis of the thrust link 66 (substantially horizontal in the present instance as shown in Fig. 5), movements of the follower 70 rearwardly or to the right along the cam track will impart rearward endwise movement to the link. Conversely, movement of the follower forwardly along the cam track will permit endwise shifting of the link in the opposite direction under the urging of the spring 92 as shown in Fig. 3. Such endwise movements are transmitted through the crank arm 76, shaft 77, arm 87 and finger 89 to the shifter fork to shift the valve plunger 60 for control purposes. The movements of the valve plunger, of course, are directly proportional to the movements of the follower roller along the cam track but, for greater accuracy of control, the valve movements are amplified substantially by reason of the leverage ratio afforded by the shifter arm and its connection with the thrust link 66 as shown diagrammatically in Fig. 13 of the drawings.

The invention provides novel mechanism for transmitting the movements of the control plunger 32 to the follower roller 70 which permit of wide variations in the extent of such movement for any given movement of the control plunger. More particularly, the motion transmitting mechanism is constructed and arranged so that for any given unit of movement of the control plunger a proportional movement of any desired and preselected length may be imparted to the follower roller 70 for shifting the valve plunger. Thus when set for a high ratio of movement, relatively small displacements of the control plunger 32 will produce substantially greater movements of the follower 70 and consequently of the valve plunger and thus adapt the mechanism for proper operation with implements subject to comparatively small ground reaction. On the other hand, the mechanism may be set to impart substantially smaller movements to the valve plunger for a unit movement of the control plunger and thus better adapt the mechanism for use with implements subject to relatively large ground reaction as, for example, plows.

Figure 6:
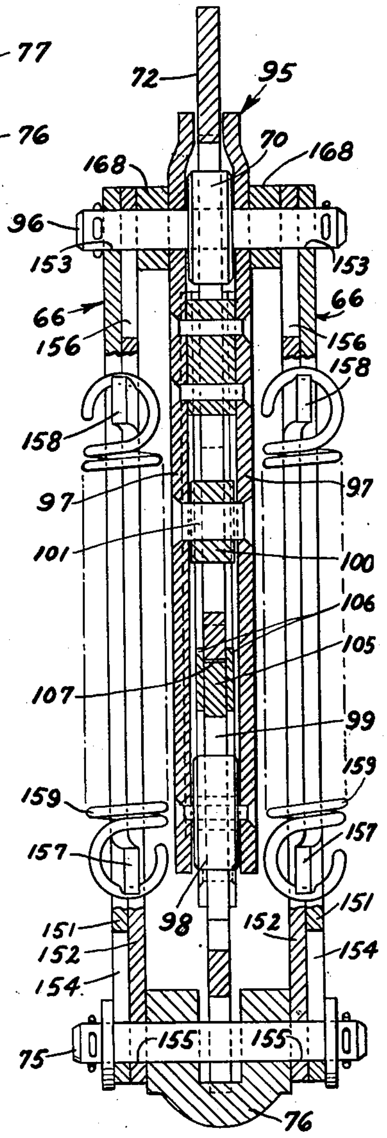
Fig. 6 is a sectional view taken in angularly disposed planes substantially on the line 6—6 of Fig. 5.

Referring now to Figs. 5, 6 and 12 of the drawings, the motion transmitting mechanism includes a differential control link 95 in the form of an elongated member or lever pivotally connected at one end to the upper end of the thrust link 66 as by a pin 96. This pin may conveniently journal the follower roller 70 previously referred to which, in cooperation with the cam track sections 71, imparts endwise movement to the thrust link. The control link in its preferred form, as shown in Fig. 6, comprises a pair of elongated bars 97 arranged side by side in straddling relation to the roller 70 and to the lower end of the bracket 72.

Rotatably supported between the bars 97 adjacent the end of the control link remote from the follower roller 70 is a second follower roller 98 adapted to cooperate with a cam track 99 formed on an adjustable member hereinafter described, which is carried by the bracket 72. A connecting element 100 pivotally connected as by a pin 101 with the bars 97 of the control link intermediate the ends of the link provides means for applying to the control link a force tending to move it transversely of its longitudinal axis.

Figures 13, 14, 15:
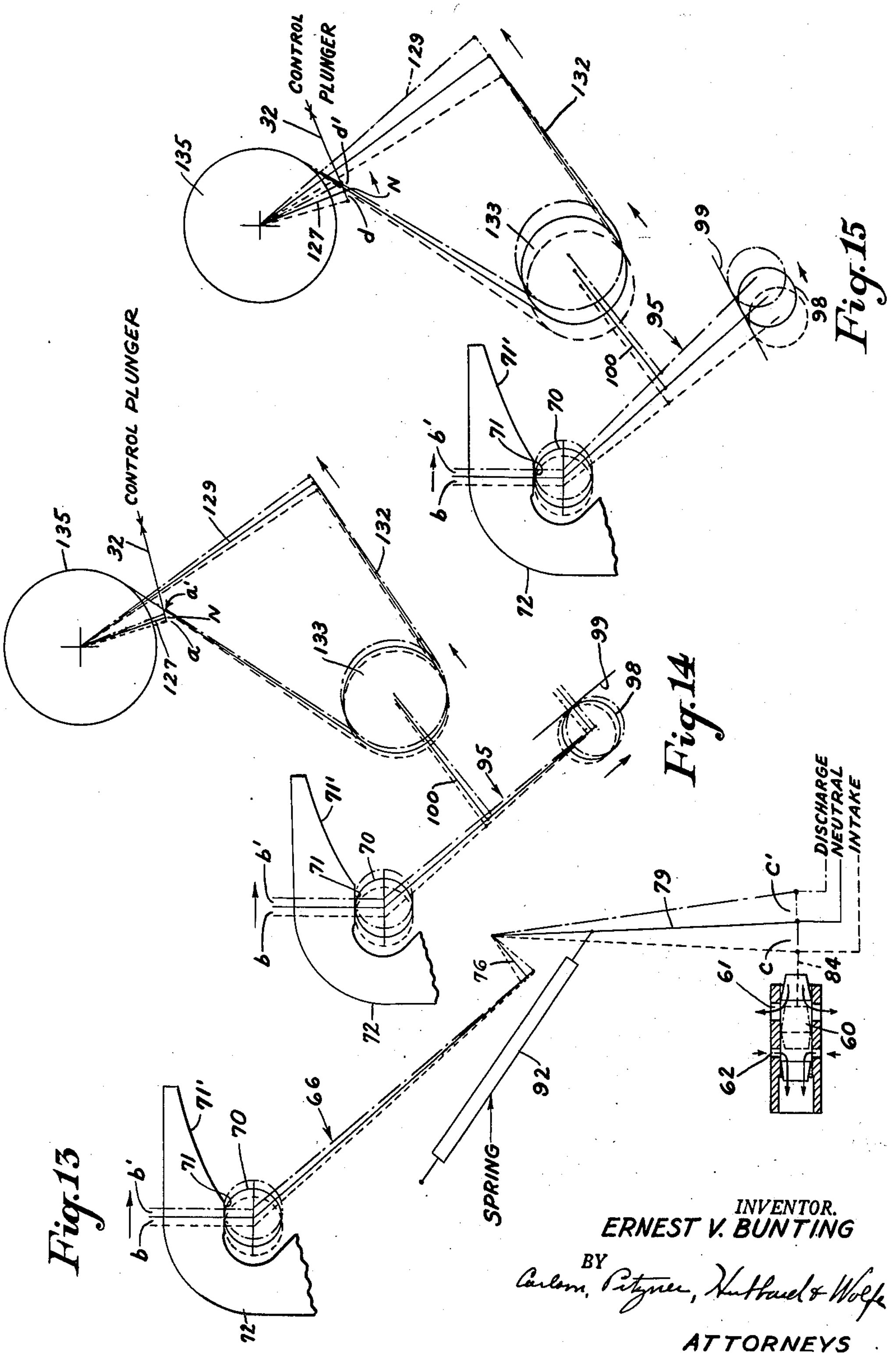
Fig. 13 is a diagrammatic view illustrating the range of movement of the control valve and the valve shifting linkage associated therewith.
Fig. 14 is a diagrammatic view illustrating the range of movement of the motion translating mechanism of the controls when adjusted for high sensitivity.
Fig. 15 is a view similar to Fig. 14 showing the controls adjusted for low sensitivity.

Movements imparted to the intermediate point of the control link will tend to move the follower rollers 70 and 98 along their respective cam tracks and the extent of such movements will depend upon the orientation of the cam tracks, that is, upon their relative angular disposition. For example, if the cam track 99 is positioned such as to effectively block any lateral movement of the lower end of the control link as shown in Fig. 14, lateral movement of the intermediate point of the link will be reflected by a lateral movement of the upper end of the link and consequently the follower roller 70 will be moved along the cam track 71 (to the right as viewed in Fig. 14). This movement will be proportional to the movement of the intermediate point (connecting pin 101) and where, as in the exemplary embodiment, the pin is located at the midpoint of the link, the follower will move through twice the distance through which the pin moves. In any case, under the conditions stated, follower 70 will receive an increased increment of movement from a given movement of the control plunger 32 and, due to the angular relation of the cam track 99 to the axis of the thrust link. With the elements related as shown in Fig. 14, a substantially greater movement will be imparted to the latter for shifting the valve plunger 60 than occurs when the elements are related as shown in Fig. 15.

On the other hand, as the disposition of the cam track 99 becomes more nearly perpendicular to the axis of the thrust link as shown in an extreme position in Fig. 15, the follower roller 98 is permitted an increasingly greater movement transversely of the link. The increment of movement imparted to the intermediate point of the control link by the connecting element 100 will therefore be divided between the upper and lower ends of the control link. Accordingly, the increment of movement of the follower roller 70 for any unit movement of the control plunger and the endwise movement imparted to the thrust link 66 will be substantially smaller than when the cam track 99 is positioned as shown in Fig. 14.

It will be evident from the foregoing that any desired ratio of movement of follower roller 70 between the two positions shown respectively in Figs. 14 and 15 may be obtained by simply varying the angular disposition of the cam track 99. An important feature of the present invention is the simple practical arrangement provided for varying the position of the cam track. In the preferred embodiment illustrated, the cam track 99 is defined by the inner edge of a generally U-shaped plate 105 (Fig. 6) confined by side plates 106 within a circular opening 107 in the bracket 72. The arrangement is such that the plate assembly may be rotated in the opening 107 substantially about the axis of the roller 98 to position the cam track 99 at any angle selected to give a desired sensitivity.

Figure 7:
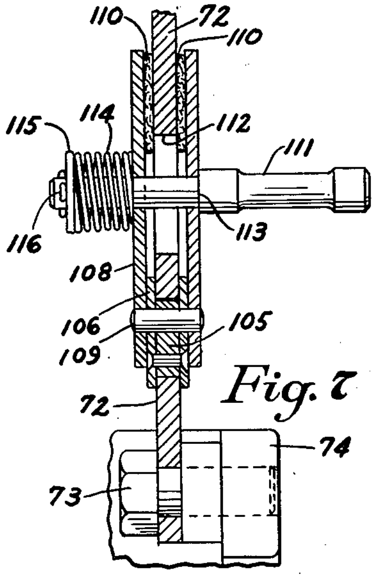
Fig. 7 is a sectional view taken in angularly disposed planes substantially on the line 7—7 of Fig. 5.
Figure 9:
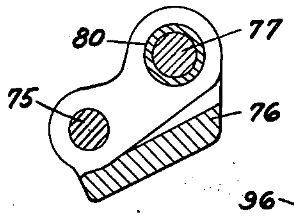
Fig. 9 is a sectional view taken in offset vertical planes substantially on the line 9—9 of Fig. 8.

For adjustment of the cam plate 105, elongated flat adjusting fingers 108 (Figs. 7 and 12) disposed on opposite sides of the bracket 72 are pivotally connected at one end by a pin 109 with the cam plate adjacent one edge, in this instance, its lower edge. At their other ends the fingers 108 are provided with friction elements 110 adapted to bear against the adjacent faces of the bracket 72.

Intermediate their ends the fingers 108 are apertured to receive a pin 111 disposed normal to the planes of the fingers and projecting through an arcuate clearance aperture 112 provided in the bracket 72. The pin 111 is formed intermediate its ends with an enlargement defining a shoulder 113 (Fig. 7) adapted to abut the outer face of one of the fingers. A spring 114 interposed between the other finger and a washer 115 fixed to the pin 111 as by a cotter 116 yieldably presses the fingers together or toward the bracket 72 thereby loading friction elements 110 and retaining engagement of the fingers with the pin 109.

As best shown in Figs. 4 and 12, the pin 111 is fixed to a crank arm 117 carried by a shaft 118 journaled in a boss 119 formed on or carried by a cover plate 120 bolted or otherwise attached to an opening in one side wall of the tractor center housing 20. At its outer end the shaft 118 is fitted with a hand lever 121 by which it can be rocked manually. An arcuate guide strip or quadrant 122 carried by arms 123 on the center housing serves to guide the hand lever in its adjusting movements. This guide strip may be located to frictionally engage with the hand lever and assist in maintaining it in adjusted positions.

While any suitable means may be utilized for operatively connecting the control plunger 32 with the control link 95, the present invention provides a particularly efficient and practical tension linkage for this purpose. As shown in Figs. 3 and 4, the control plunger is formed at its forward end with an extension 125 suitably curved to clear the hub of crank arm 47. The extension 125 is pivotally connected as by a pin 126 with a crank arm 127 pinned or otherwise non-rotatably fixed to a cross shaft 128 journaled in the cover plate 42 of the center housing. Also fixed on the shaft 128 is a depending crank arm 129 formed at its outer end with a segmental shoe 130 having its outer face formed on a radius centered on the axis of the shaft 128.

Adjacent its rear edge, the shoe 130 is provided with a spring holding clip 131 for anchoring one end of a flexible element such as a flat metal strap 132 to the shoe. This strap is carried forwardly over the arcuate face of the shoe and looped over a flat faced sheave 133 rotatably secured as by a pin 134 to the free end of the connecting element 100. The other end of the strap is partially wound around and attached to a sheave 135 keyed to a hollow shaft 136 supported in axial alinement with the shaft 128 and serving as a bearing for the adjacent end of the latter shaft. As shown in Fig. 3, attachment of the strap 132 to the sheave 135 and shoe 130 is effected by folding over the end portions of the strap and mounting them in radially opening slots 135' and 130'. A holding clip 136' secured to the sheave by a screw 137' with one end overlying the slot 135' retains the strap in place on the sheave. Arcuate plates 137 fixed to opposite sides of the shoe 130 and circular plates 138 on opposite sides of the sheave 135 retain the strap 132 in place thereon.

Assuming by way of illustration that the sheave 135 is held stationary, it will be evident that fore and aft movements of the control plunger 32 will impart corresponding rocking movements to the shaft 128 and the crank arm 129 and such movements will be transmitted through the strap 132, sheave 133 and connecting element 100 to the control link 95. By suitably proportioning the crank arms 127 and 129 substantial amplification of the movements of the control plunger 32 may be obtained.

It will be evident that the effective length of the strap 132 and thus the relative position of the control link 95 with reference to the control plunger 32 may be varied by simply rotating the sheave 135 to wind up more or less of the strap. In the control organization illustrated, the rotation of the sheave 135 is effected by the manually operable quadrant lever 65. Such setting determines the neutral position of the valve plunger 60 for any position of the control plunger 32 and thus the depth at which an implement is intended to operate.

It will be appreciated that a substantial force is exerted on the flexible strap 132 at all times by the spring 92 tending to unwind the strip from the sheave 135 and thus rock the shaft 136 in a clockwise direction as viewed in Fig. 3. Such rocking of the shaft is prevented without imposing any unnecessary resistance to its manual actuation by suitable one way locking means interposed between the shaft 136 and the quadrant lever 65 by which it is manually positioned.

As will be seen by reference to Fig. 4 of the drawings, the shaft 136 is journaled at its inner end in a suitable bearing within the cover plate 42. The shaft is tubular and its inner end serves as a bearing for the shaft 128. At its outer end the shaft 136 terminates in an enlarged cylindrical head 140 journaled in a recess formed in a boss 141 at one side of the cover plate. The recess is extended by a ring 141' and is closed by a cover 142, the ring and cover being bolted or otherwise secured to the boss 141.

Projecting axially from the outer face of the head 140 are a pair of arcuate lugs 143 (Fig. 4) disposed at the same side of a plane through the axis of the recess defined by the ring 141' and terminating at their upper edges somewhat below that plane. The lugs 143 underan arcuate lug 144 projecting axially from the adjacent face of a cylindrical head 145 on the inner end of a shaft 146 which extends outwardly through a suitable opening in the cover 142 and to which the quadrant lever 65 is non-rotatably fixed in known manner.

As will be seen by reference to Fig. 11, the edges of the lug 144 are terminated above the axial plane of the recess, leaving space for the accommodation of a key 147 between them and the adjacent edges of the lugs 143 with the key disposed substantially diametrically of the recess. A spring 148 urges the key transversely of the recess (away from the lugs 143) and thus tends to wedge it against the swalls of the recess. As herein shown, the spring is mounted on and guided by a pin 149 having a head disposed between the lugs 143 and a tip portion of reduced diameter engaged in an aperture in the key 147. The spring in this instance is interposed between the head of the pin and the adjacent face of the key.

Preferably the key 147 is dimensioned so as to clear the walls of the recess when disposed diametrically thereof but to engage the walls if shifted transversely from that position. When both the shafts 136 and 146 are at rest, the spring 148 accordingly tends to wedge the key in the recess at the side occupied by the lug 144. Accordingly, any torque applied to the shaft 136 and acting on the key through the lugs 143 will simply tend to wedge the key more firmly in the recess and thus effectively prevent rotation of the shaft. On the other hand, torque applied to the shaft 146 acting through the lug 144 will shift the key out of its wedging position and thus free both shafts for easy rotation. It will be evident, therefore, that adjustments of the strap anchoring sheave may be made with application of a minimum force to the quadrant lever while at the same time reverse rocking of the shaft is effectively prevented by the action of the locking means above described.

*Safety thrust line*

Figure 16:
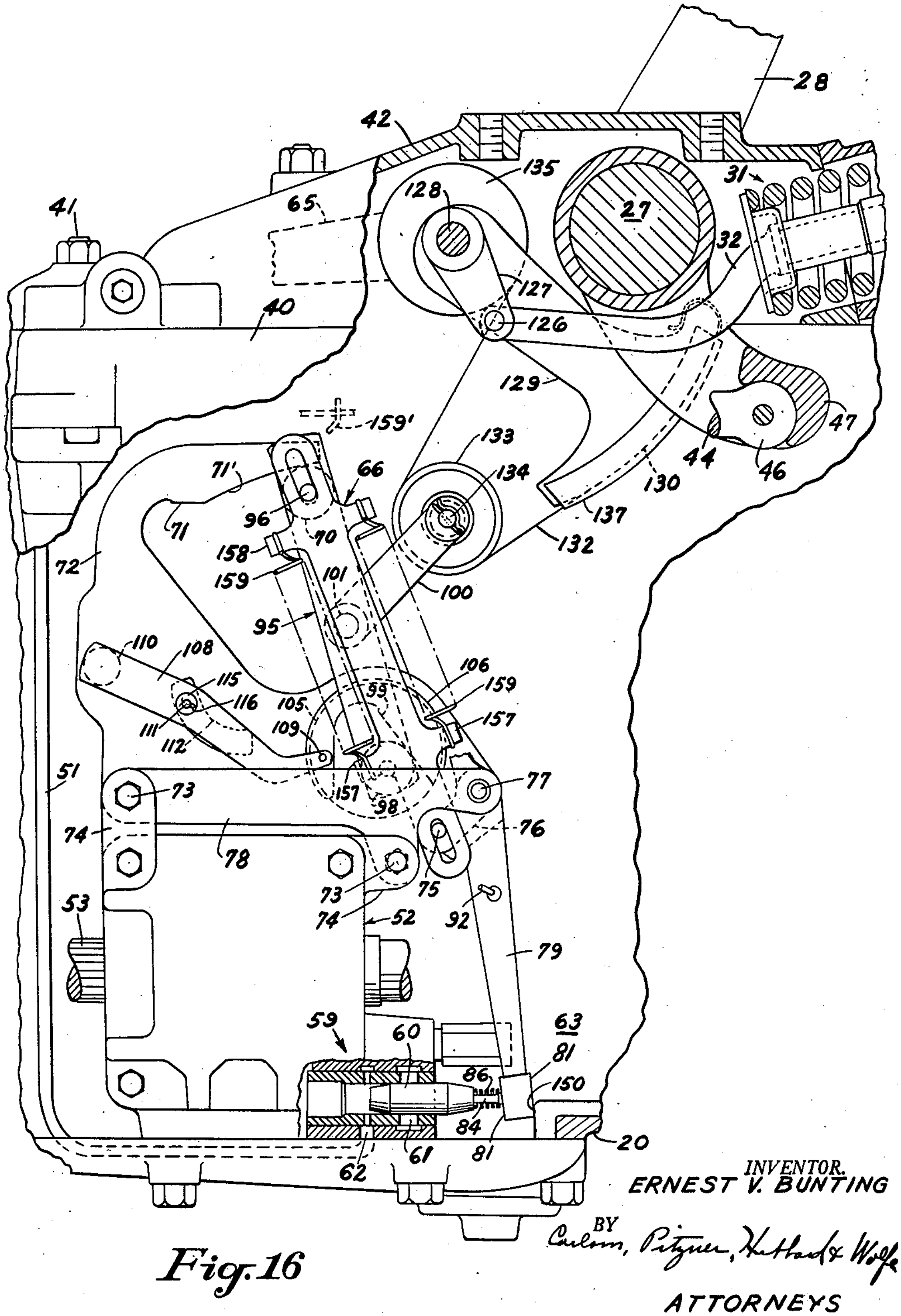
Fig. 16 is a view similar to Fig. 3 showing the thrust link in collapsed condition.

In the operation of a tractor equipped with a power operated system of the type above described, it occasionally happens that an actuating force is applied to the valve shifting elements tending to carry it beyond the position in which the valve plunger 60 is in full exhaust position. For example, the quadrant lever 65 when rocked downwardly draws the thrust link 66 to the right (as viewed in Fig. 3) and a positive thrust is exerted on the shifter fork 79 to move the valve plunger 60 in a direction to open the exhaust ports 62. As the valve plunger reaches the full exhaust position in which it is shown in Fig. 16, further movement of the shifter fork is prevented by an abutment 150 interposed in the path of the fork. Accordingly, the movement of the quadrant lever may be such that it tends to shift the valve plunger 60 beyond its permissible range of travel as defined by the abutment 150. A similar action takes place upon application of excessive tension forces on the top link 26.

To avoid undue strain on or damage to the valve shifting elements under such conditions, the thrust link 66 is constructed in a novel manner which permits it to absorb an excessive applied force and later release that force gradually for reestablishing its control position. To this end the thrust link is constructed so that it normally acts as a rigid member of fixed length, that is, of the length shown in Fig. 3, but when subjected to a thrust force exceeding a predetermined value it collapses or decreases in length as shown in Fig. 16 and in such collapse stores power in a spring for re-extending the link to its normal length.

Referring now to Figs. 3, 5 and 6 of the drawings, the thrust link 66 in its preferred form is made up of two similar pairs of elongated flat metal strips 151 and 152, the strips of each pair being assembled in face to face relation and the respective pairs being disposed parallel and on opposite sides of the control link 95. Each of the strips 151 is formed at one end with an aperture 153 dimensioned to receive the supporting pin 96 for the follower roller 70 with a snug fit. At their other ends the strips 151 are formed with elongated slots 154 slidably receiving the pivot pin 75 connecting the thrust link with the crank arm 76.

The strips 152 are generally similar to the strips 151 but are reversely positioned with respect thereto. Thus each strip 152 has at one end an aperture 155 dimensioned to receive the pin 75 with a snug fit and at the other end an elongated slot 156 for slidably receiving the pin 96. The strips are thus movable endwise relative to each other through a distance corresponding to the length of the slots.

Adjacent their slotted ends the strips 151 are formed with lugs 157 projecting laterally from opposite side edges of the strip and offset slightly from the plane of the strip to partially overlie the companion strip 152. Similarly the strips 152 are formed adjacent their slotted ends with lugs 158 projecting from opposite side edges and offset so as to aline with the lugs 157.

Coiled tension springs 159 connect each pair of the alined lugs 157 and 158 and exert a force tending to draw the lugs toward each other and thus to slide the strips 151 and 152 in a direction to elongate the link 66. Relative movement of the strips is limited, however, by the pins 75 and 96 engaging the outer ends of the slots 154 and 156. The strips are shown in Fig. 6 in such limit position which is their normal or extended position.

Endwise thrust imparted to the assembly of strips and springs through the follower roller 70 and pin 96 is resisted by the springs 159 under normal operating conditions so that the thrust is transmitted through the link and pin 75 to the crank arm 76. However, when the thrust force exceeds a predetermined value, as when the shifter fork 79 is blocked by the abutment 150, the springs 159 yield and allow the strips 151 and 152 to slide relative to each other and to the pins engaged in their respective slots 154 and 156. The distance between the pins and therefore the effective length of the thrust link is thereby decreased and at the same time additional power is stored in the springs 159.

As a further means of guarding the valve shifting mechanism against damage and to avoid undue lengthening of the springs 159, provision is made for allowing rearward movement of the thrust link roller 70 beyond its normal range of travel when the link is fully collapsed. Such extended travel is over the cam track section 71', which, as shown in Figs. 5 and 16, extends upwardly and rearwardly from the rear end of the horizontal section 71. As the roller 70 engages the section 71' the thrust link is permitted to shorten at a reduced rate while in the collapsed or breakout position and thus avoid forcing the valve shifting elements beyond the limit position defined by the abutment 150. A fixed stop 159' (Fig. 16) prevents inertia from causing the roller to run beyond the section 71'.

In order to automatically restore the motion transmitting linkage to normal operating condition when the condition producing the collapse or breakout of the thrust link is removed, the cam track section 71' is formed so as to permit return of the follower roller 70 to the cam track section 71 under the bias of the springs 159. To this end the cam track section 71' is formed with an arcuate contour having a radius centered somewhat to the left of the center about which the thrust link pivots, namely, the pin 75. In the particular structure illustrated, the center on which the cam track section 71' is guided is located adjacent the axis of the bolt 73 which secures the bracket 72 to the lug 74. This locates the point of control of the follower roller 70 with the cam track section 71' rearwardly (to the right as viewed in Fig. 16) of the central axis of the thrust link 95. Consequently, the forces stored in the spring 159 and exerted against the cam track through the roller 70 tends to shift the roller forwardly (to the left), thereby returning it to the horizontal section 71.

Lowering of the hitch linkage and attached implement which follows the shifting of the valve plunger to the full exhaust position as above described is reflected in a movement of the control plunger 32 in a direction tending to return the valve plunger to neutral position. The valve plunger, however, is retained in its shifted position during the forward travel of the roller 70 along the cam track sections 71' and 71 until, through the action of the springs 159, the link is fully extended. Thereafter the control plunger operates in the normal manner to allow return of the valve plunger to neutral position when the implement reaction corresponds to the value determined by the setting of the quadrant lever. With this arrangement correct response of the controls to both the manual and automatic actuating instrumentalities is insured and at the same time damage to the parts by excessive movement of the thrust link is precluded.

*Transport shut-off*

The manually actuated elements of the controls are constructed and arranged so that the power operated system may be conditioned to raise the hitch linkage and attached implement to an elevated or transport position by simply rocking the quadrant lever 65 to the upper limit position in which it is shown in Fig. 3 of the drawings. Provision is made for shutting off the power system, that is, for automatically shifting the valve plunger 60 to the neutral position when the implement reaches such transport position without regard to the force exerted on the control plunger at that time. Thus the shut-off of the power system at transport position is insured regardless of the type of implement attached to the hitch linkage.

Referring to Figs. 3, 4 and 10 of the drawings, transport shut-off mechanism in its preferred form comprises an elongated bar 161 supported for endwise sliding movement longitudinally of the actuator cylinder 40 by suitable guides 162 mounted at one side of the cylinder. At its rear end the bar 161 is formed with a hook-like tip 163 projecting laterally of the bar and into the path of the piston 43. An offset 164 adjacent the forward end of the bar defines a shoulder or abutment 165 and engages with the upper end of a lever 166 pivoted at 167 on the pump housing. The lever 166 is formed in this instance by a pair of elongated flat bars arranged in spaced parallel relation and having their upper ends offset inwardly and suitably secured together as by spot welding. As will be seen by reference to Figs. 3 and 5 of the drawings, the pivot 167 of the lever 166 is disposed so that the rear edge of the lever is adapted to engage spacer bushings 168 carried by the pin 96 when the lever is rocked by the rearward movement of the bar 161. Thus the linkage heretofore described is shifted in a direction to move the valve plunger 60 to neutral position. In practice the parts are constructed so that the valve plunger reaches neutral position as the hitch linkage and attached implement arrive in transport position.

To lower the implement from transport position, the quadrant lever 65 is swung downwardly thus rotating the sheave 135 in a direction to wind up the band 132. When the slack in the band resulting from the action of the lever 166 on the thrust link assembly is taken up, the roller 70 is shifted farther to the rear with a consequent movement of the valve plunger 60 to exhaust position. Fluid is accordingly vented from the actuator cylinder 40 and piston 43 retreats into the cylinder and away from the tip 163 of the operating bar 161.

Upon subsequent movement of the thrust link assembly as when the valve plunger 60 is moved toward the intake position, the spacer bushings 168 engage the lever 166 and swing it back to normal rest position. The upper end of the lever 166, through its engagement with the shoulder 165, shifts the bar 161 to the left thus resetting the transport shut off mechanism for normal control operation.

*Overload release*

Provision is made for quickly unloading the power operating system of the tractor automatically whenever the draft load on the hitch linkage exceeds a predetermined safe value as, for example, when a plow pulled by the tractor strikes an obstruction such as an underground boulder or stump. The release of pressure fluid from the ram cylinder 40 under such conditions reduces the traction load on the tractor's rear drive wheels, permitting them to spin and thus avoid damaging the tractor, the implement or the connecting linkage.

For releasing fluid from the ram cylinder the exemplary power system has been shown as equipped with an emergency release valve 170 (Fig. 3) similar to that disclosed and claimed in my copending application Serial No. 256,112, filed November 13, 1951, now Patent No. 2,707,612. This valve is normally closed and is opened for release of fluid by rocking a valve actuating lever 171 about its pivot 172 on a bracket 173 carried by the valve body. Cooperating with the free end of the lever 171 is a push rod 174 supported and guided by a bracket 175 for endwise sliding movements generally parallel to the axis of the cylinder. The rear end of the push rod 174 is positioned for engagement with the free end of an arm 176 pinned or otherwise non-rotatably fixed on the shaft 128 to which the control plunger 32 is connected. The arrangement is such that upon forward movement of the control plunger beyond its normal operating range, it will swing the arm 176 against the rear end of the push rod 174 and thus rock the lever 171 to valve opening position. As explained in the application above referred to, the initial opening of the valve is effective to bring about substantially instantaneous full opening so that the ram cylinder is vented quickly and the tractor drive wheels relieved of the traction otherwise resulting from transfer of weight to the drive wheels through operation of the hydraulic system.

*Résumé*

Adjustment of the controls for sensitivity may be made at any time regardless of whether the implement attached to the hitch linkage is in the raised or transport position or is in actual working engagement with the ground. In neither case is the operation of the depth control adjustment affected since movement of the sensitivity control lever 121 from one position to another does not impart movement to the valve plunger 60. The positioning of the sensitivity control lever determines the angular disposition or slope of the cam track 99 with respect to the longitudinal axis of the control member 95 and thus establishes the ratio of the movements imparted to the ends of that member for a given movement of the control plunger 32.

A further advantage of the above described arrangement is that adjustment of the cam track 99 to vary sensitivity automatically compensates for changes in the loading effect of the tension spring 92 on the control spring 31. More specifically stated, upon adjustment of the cam track 99 to change sensitivity, the roller 98 on the thrust link is shifted in one direction or the other and the position of the pin 101 connecting the thrust link with the draft responsive members is altered with a corresponding change in the load on the control spring. At the same time, however, the mechanical advantage between the fork member 79 and control rod 32 is altered so that the same force continues to be exerted on the fork member. Since the force acting on the fork member remains unchanged, the position of the valve plunger 60 remains unchanged due to such sensitivity adjustment.

For use with a cultivator or other implement subject to relatively small ground reaction, the controls may be set for increased sensitivity by rocking the lever 121 clockwise (as viewed in Fig. 12) toward the limit position defined by the pin 111 engaging the upper end of the slot 112. Such movement of the lever acts through the link 108 to rock the cam plate 105 clockwise to locate the cam track 99 in the position shown in Fig. 14. In this position the lower end of the control member 95 is restrained against transverse movement and accordingly the full movement of the control plunger 32 transmitted through the crank arms 127 and 129, the flexible strap 132, sheave 133 and connecting element 100 is transmitted to the upper end of the control member. This traverses the follower 70 along the cam track 71 imparting endwise movement to the thrust link 66 which, through the crank arm 76 and shifter fork 79 imparts corresponding movements to the valve plunger 60.

By reference to Fig. 14 of the drawings, it will be observed that movement of the control plunger in either direction from the neutral position N indicated by the full line 127 through the relatively small increment *a* or *a'* will impart a substantial increment of movement *b* or *b'* to the follower 70. A corresponding increment of endwise movement is imparted to the thrust link 66 as indicated in Fig. 13, and such endwise movement suitably amplified by the crank and shifter fork linkage imparts a relatively large increment of movement *c* or *c'* to the valve plunger 60.

For implements subject to high ground reaction such as plows, a much lower sensitivity of the controls is desirable to avoid excessive operation of the hydraulic system. To adjust the controls for such lower sensitivity the control lever 121 is swung counterclockwise (as viewed in Fig. 12), thus rocking the cam plate 105 to position the cam track 99 at an angle to the longitudinal axis of the control member 95. When the cam track is positioned as shown in Fig. 15 for instance, a much greater increment of movement *d* or *d'* of the control plunger 32 is required to impart the increment of movement *b* or *b'* to the follower roller 70. Thus as shown in this figure, the increment *d* or *d'* is much greater than the length of the increment *a* or *a'* and yet produces the same increment of movement of the follower 70 and consequently of the valve plunger 60. This is for the reason that the lateral movements of the sheave 133 and the intermediate point of the control member 95 to which it is connected, are divided between the cam track 71 and the cam track 99. Thus the ratio of the response of the valve plunger 60 to movements of the control plunger is susceptible of infinite variation within the limits afforded by the system.

It will be understood that the sensitivity settings above described are merely examples and that by appropriate positioning of the control lever 121 other ratios between and beyond those mentioned may be obtained. In general, however, the arrangement illustrated provides very efficient operating conditions for plows and similar implements.

Despite the wide range of adjustment afforded by the improved controls provided by the instant invention, the controls are made up of simple sturdy parts which can be produced inexpensively, for example, as sheet metal stampings. Moreover, the controls form a very compact unit which is advantageous in that they can easily be accommodated within the center housing of a conventional tractor. This compactness results in part from the novel manner in which the control member 95 and thrust link 66 are related and the mounting of those parts on the supporting bracket 72. Furthermore, these parts are all readily accessible through the opening covered by the access plate 120 so that repairs, replacements or adjustments can be effected with a minimum of labor.

In general, therefore, it is apparent that the invention provides a practical and efficient control system which adapts the power operating system of the tractor for use with any type of implement.

I claim as my invention:

1. In a power operating system for a tractor-borne draft linkage, the combination of a pressure fluid operated actuator operative to raise or lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said ling coacting with said cam track, said cam track being disposed at an angle such that movements of said follower along the track impart endwise movements to said link to swing said lever about its pivot, a linkage interposed between said follower and said control member operative to shift the follower along said cam track in response to the displacement of the control member, and means in said linkage adjustable to determine the extent of movement of said follower for a given movement of said control member.

2. In a power operating system for an implement hitch linkage mounted on a tractor, the combination of a pressure fluid operated actuator, valve mechanism controlling the supply of pressure fluid to and exhaust of pressure fluid from said actuator, a draft responsive member displaceable in either of two directions from a neutral position in accordance with changes in the reactive force of an implement attached to the hitch linkage, means defining a cam track, means for actuating said valve mechanism including a member connected to the mechanism and having a follower engageable with said cam track, spring means yieldably urging said follower toward one end of said cam track, means including a flexible tension element connecting said draft responsive member with said follower, and manually adjustable means in said connecting means operable to modify the movements of said follower along said cam track in response to the displacement of said control member from neutral position.

3. In a power operated system for a tractor-borne draft linkage, the combination of a pressure fluid actuator operative to raise or lower the linkage, shiftable valve means controlling the supply of pressure fluid to and exhaust of pressure fluid from said actuator to effect the raising or lowering of the linkage, a control member adapted to be displaced in accordance with the load imposed on the draft linkage, mechanism interposed between said control member and said valve means for shifting said valve means proportionally to the movements of the member, said mechanism including an elongated rigid member connected at an intermediate point to the control member and movable therewith in a path generally transversely of the longitudinal axis of the elongated member, means defining a guide surface cooperating with said rigid member at a second point spaced longitudinally from said intermediate point to confine the movements of said second point to a path disposed at an acute angle to said first mentioned path, a thrust link connected to said elongated member adjacent said second point, the movements of said second point in said path serving to impart endwise movement to said thrust link, and a linkage connected to transmit the endwise movement of said thrust link to said valve means.

4. In a power operating system for a tractor-borne draft linkage, the combination of a pressure fluid operated actuator operative to raise or lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said link coacting with said cam track, said cam track being disposed at an angle such that movements of said follower along the track impart endwise movements to said link to swing said lever about its pivot, an elongated member connected at one end to said follower, means connecting said elongated member at an intermediate point with said control member for movement therewith, and means cooperating with the other end of said elongated member for determining the extent of movement of said follower for a given movement of said elongated member at its point of connection with said control member.

5. In a power operated system for a tractor-borne draft linkage, the combination of a pressure fluid actuator operative to raise or lower the linkage, shiftable valve means controlling the supply of pressure fluid to and exhaust of pressure fluid from said actuator to effect the raising or lowering of the linkage, a control member adapted to be displaced progressively in proportion to the draft load imposed on the draft linkage, mechanism interposed between said control member and said valve means for transmitting the movements of the member to the valve means, said mechanism comprising an elongated rigid member connected to the control member for movement with it and in a path disposed generally transversely of the axis of the elongated member, means presenting a cam surface cooperating with one end of said elongated member to guide the movements thereof, a thrust link connected to and movable with said one end of the elongated member, said cam surface being disposed at an angle to said path of movement of the elongated member so as to impart an increment of endwise movement to said thrust link in response to the transverse movements of the elongated member, and a linkage connected to transmit such endwise movement of the trust link to said valve means.

6. In a power operated system for a tractor-borne draft linkage, the combination of a pressure fluid actuator operative to raise or lower the linkage shiftable valve means controlling the supply of pressure fluid to and exhaust of pressure fluid from said actuator to effect the raising or lowering of the linkage, a control member adapted to be displaced from a neutral position according to the load imposed on the draft linkage, mechanism interposed between said control member and said valve means for transmitting the movements of the member to the valve means, said mechanism comprising an elongated rigid member connected to the control member for movement with it in a path disposed generally transversely of the axis of the elongated member, means presenting a cam surface cooperating with one end of said elongated member to guide the movements thereof, a thrust link connected to and movable with said one end of the elongated member, said cam surface being disposed at an angle to said path of movement of the elongated member so as to impart an increment of endwise movement to the thrust link in response to transverse movements of the elongated member, means for adjustably restricting the movement of the other end of said elongated member to vary the ratio of the movement of said one end with respect to the movement of the other end, and a linkage connected to transmit the endwise movement of said thrust link to said valve means.

7. In a power operated system for a tractor-borne draft linkage, the combination of a pressure fluid actuator operative to raise or lower the linkage, shiftable valve means controlling the supply of pressure fluid to and exhaust of pressure fluid from said actuator to effect the raising or lowering of the linkage, a control member adapted to be displaced progressively in accordance with the load imposed on the draft linkage, mechanism interposed between said control member and said valve means for shifting said valve means proportionally to the movements of the member, said mechanism including an elongated rigid member connected at an intermediate point to the control member and movable therewith in a path generally transversely of the longitudinal axis of the elongated member, means defining guide surfaces cooperating with said rigid member at two points disposed at opposite sides of said intermediate point and spaced longitudinally therefrom to determine the paths of movement of such two points, a thrust link connected to said elongated member at one of said two points, one of said guide surfaces being disposed at an angle to said first mentioned path so as to impart to said thrust link an increment of endwise movement in response to the lateral movement of the elongated member, the other of said guide surfaces being selectively positionable at different angles with respect to said one guide surface to variably determine the ratio of the movements of said two points along their respective paths for a given movement of said intermediate point, and a linkage connected to transmit the endwise movement of said thrust link to said valve means.

8. Mechanism for translating the movements of one control member into proportional movements of another control member comprising, in combination, an elongated rigid member connected at an intermediate point for movement with said one control element generally transversely of the axis of the member, guide means cooperating with the opposite ends of said elongated member to direct its movement and to determine the ratio of movement of one end of the member with respect to the movement of the other end of the member in response to said movement of the intermediate point of the member, said guide means being adjustable to vary said ratio within predetermined limits, and a motion transmitting linkage connecting said one end of the elongated member with said other control member.

9. Mechanism for transmitting the movements of one control member proportionally to a second control member comprising, in combination, an elongated rigid member, means connecting an intermediate point on said rigid member with said one control member to move bodily therewith in a path generally transverse to the longitudinal axis of the rigid member, cam surfaces guiding the movements of opposite ends of said rigid member, said cam surfaces being adjustable to variably proportion the bodily movement of the intermediate portion of said rigid member between the two ends thereof, and means connecting said second control member with one end of said rigid member, the cam surface guiding said one end of the rigid member being disposed at an angle to the cam surface guiding the other end of the member so as to impart an endwise increment of movement to said second control member.

10. Mechanism for variably shifting one control element in response to the shifting of another control element through a predetermined distance comprising, in combination, an elongated rigid member adapted to be shifted transaxially by said other control element, means defining a cam surface disposed at an angle to the longitudinal axis of said rigid member, a thrust link operatively associated at one end with said rigid member, a follower adjacent said one end of the thrust link coacting with said cam surface to shift said link endwise in one direction or the other as the follower moves back and forth along said cam surface, means defining a second cam surface disposed at an angle to said first-mentioned cam surface and cooperating with the other end of said rigid member for determining the ratio of the movements imparted to the ends of the member for a given transverse movement of the member, said second cam surface defining means being manually adjustable to vary the ratio within predetermined limits.

11. In a power operating system for a tractor-borne draft linkage, the combination of a pressure fluid operated actuator operative to raise or lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said link coacting with said cam track, said cam track being disposed at an angle such that movements of said follower along the track impart endwise movements to said link to swing said lever about its pivot, and means connecting said follower to said control member for movement therewith.

12. Mechanism for transmitting the movements of a control member proportionally to a valve plunger comprising, in combination, an elongated rigid member, means connecting said control member to said rigid member at an intermediate point to impart thereto bodily movement in a path transverse to its longitudinal axis, means defining cam surfaces located adjacent opposite ends of said rigid member, followers on said rigid member cooperating with said cam surfaces to guide the ends of the member, one of said cam surfaces being disposed at an angle with respect to the other of said cam surfaces to determine the extent and direction of movement of each end of the member for a given movement of the intermediate point of the member, said cam surface defining means being adjustable to vary the angle between said two cam surfaces, a thrust link connected to one end of the rigid member to receive an increment of endwise movement proportioned to the extent of movement of that end of the member, and a linkage connected to transmit the endwise movements of said thrust link to the valve plunger.

13. In a power operating system for a tractor-borne draft linkage, the combination of a pressure fluid operated actuator operative to raise or lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said link coacting with said cam track, said cam track being disposed at an angle such that movements of said follower along the track impart endwise movements to said link to swing said lever about its pivot, a manually operable element, and means operable alternatively by said element and said control member for moving said follower along said cam track.

14. The combination with a shiftable control member, of a lever having its free end operatively associated with said control member and swingable to shift the same, an abutment positioned in the path of said lever for limiting its swinging movement in one direction, a link connected to said lever, means for exerting an endwise thrust on said link tending to swing said lever in said one direction, said link including a pair of elongated metal strips assembled in face to face relation and interconnected for relative endwise sliding movement, and spring means urging said strips to an extended position, said spring means yielding to permit relative movement of the strips when the endwise thrust is maintained on the link after said lever engages said abutment.

15. A thrust link comprising, in combination, a first pair of parallel bars assembled in face to face relation, a second pair of parallel bars assembled in face to face relation and disposed in spaced parallel relation to said first pair of bars, one of the bars of each pair having a longitudinally disposed slot adjacent one end and the other bar of each pair having a similar slot adjacent its other end, a pin anchored in the unslotted end of each of said bars and extending through the slots in the corresponding ends of the other bars, said pins being movable in said slots and effective to restrict relative endwise movement of the bars to a predetermined range, and tension springs acting between the bars of each pair to urge them to one limit position of said range.

16. A thrust link comprising, in combination, a pair of flat elongated bars assembled in face to face relation, a first pin anchored adjacent one end of one of said bars and projecting through a longitudinally disposed slot adjacent the corresponding end of the other bar, a second pin anchored to said other bar adjacent the end remote from said slot and projecting through a longitudinally disposed slot adjacent the corresponding end of said one bar, a lug extending from the side edge of each bar adjacent its slotted end, and a tension spring connected between said lugs, said spring urging said bars to a limit position defined by engagement of said pins with the outer ends of the slots through which they project.

17. A thrust link comprising, in combination, a pair of flat elongated bars assembled in face to face relation, a first pin anchored adjacent one end of one of said bars and projecting through a longitudinally disposed slot adjacent the corresponding end of the other bar, a second pin anchored to said other bar adjacent the end remote from said slot and projecting through a longitudinally disposed slot adjacent the corresponding end of said one bar, a pair of lugs projecting from opposite side edges of each bar adjacent their slotted ends, said lugs being offset in opposite directions from the planes of the respective bars so as to substantially aline the lugs on one bar with the correspondingly positioned lugs on the other bar, and tension springs connected between the alined pairs of lugs.

18. A thrust link comprising, in combination, a first pair of parallel bars assembled in face to face relation, a second pair of parallel bars assembled in face to face relation and disposed in spaced parallel relation to said first pair of bars, one of the bars of each pair having a longitudinally disposed slot adjacent one end and the other bar of each pair having a similar slot adjacent its other end, a pin anchored in the unslotted end of each of said bars and extending through the slots in the corresponding ends of the other bars, said pins being movable in said slots and effective to restrict relative endwise movement of the bars to a predetermined range, a lug projecting from a side edge of each bar adjacent its slotted end, and a tension spring connected between the lugs of each pair of bars, said springs urging the bars to one limit position and yielding to permit relative movement between the bars when the thrust force imposed thereon exceeds a predetermined value.

19. The combination with a tractor having an implement hitch linkage trailingly mounted thereon and a power unit for raising and lowering the linkage, a control element associated with the power unit and displaceable in either direction from a neutral position to initiate the operation of the unit for raising or lowering the linkage, a draft responsive control member shiftable in opposite directions from a neutral position in response to changes in the forces imposed on the linkage by an implement attached thereto, means for transmitting the movements of said control member to said control element including a pivoted arm adapted to be rocked about its pivot in response to the displacement of the control member, a linkage connected to said control element, a sheave connected to an element of said linkage, a shaft supported to rock about an axis coincident with the pivot of said arm, a second sheave fixed on said shaft, a flexible element looped over said first mentioned sheave and having its opposite ends secured respectively to the free end of said arm and to said second sheave, and a hand lever for rotating said shaft to wind the flexible element on or pay it out from said first mentioned sheave and thereby adjust the neutral position of said control element with respect to the neutral position of said control member.

20. In a power operating system for an implement hitch linkage mounted on a tractor, the combination of a pressure fluid operated actuator, valve mechanism controlling the supply of pressure fluid to and exhaust of pressure fluid from said actuator, a draft responsive member displaceable in either of two directions from a neutral position in accordance with changes in the reactive force of an implement attached to the hitch linkage, means defining a cam track, means for actuating said valve mechanism including a member connected to the mechanism and having a follower engageable with said cam track, spring means yieldably urging said follower toward one end of said cam track, a rotatable element, a pivotal arm adapted to be rocked about its pivot upon movement of said draft responsive member, a sheave connected to said follower, a flexible element looped over said sheave and having its opposite ends respectively connected to the free end of said arm and to said rotatable element, said sheave being movable bodily by said flexible element in response to the rocking of said arm and being operative to move the follower along said cam track, and manually operable means for turning said rotatable element to vary the effective length of said flexible element and thereby modify the position of the follower with respect to the neutral position of said draft responsive member.

21. In a tractor having an implement hitch linkage trailingly mounted thereon and a pressure fluid operated power unit for raising and lowering the linkage, valve mechanism for controlling said power unit, mechanism for shifting said valve mechanism to initiate raising or lowering of the hitch linkage including a member spring biased to shift the valve mechanism in one direction, means for shifting the valve mechanism in the opposite direction comprising a rotatably suported shaft, a draft responsive control member connected to and operative to rock said shaft, a flexible element connecting said shaft with said spring biased member, a hand lever operable to rock said shaft, and a latch associated with said shaft effective to resist rotation of the shaft by the force applied thereto through said flexible element, said latch being disengaged incident to the movement of said hand lever to rock the shaft in either direction.

22. In a power operating system for a tractor-borne draft linkage, the combination of a pressure fluid operated actuator operative to raise or lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said link coacting with said cam track, said cam track being disposed at an angle such that movements of said follower along the track impart endwise movements to said link to swing said lever about its pivot, means operable in response to the displacement of said control member for moving said follower along said cam track, and other means operable by said actuator for moving said follower along said cam track independently of said control member operated means.

23. In a power operating system for a tractor-borne draft linkage, the combination of a pressure fluid operated actuator operative to raise or lower the linkage, shiftable valve mechanism controlling the supply of pressure fluid to an exhaust of pressure fluid from said actuator, a control member adapted to be displaced progressively in proportion to the draft load imposed on the draft linkage, means for shifting said valve mechanism in response to displacement of said control member including a pivotally supported lever operatively associated with the valve mechanism, an elongated thrust link pivotally connected at one end to said lever, means defining a cam track adjacent the other end of said link, a follower on said link coacting with said cam track, said cam track being disposed at an angle such that movements of said follower along the track impart endwise movements to said link to swing said lever about its pivot, means operable in response to the displacement of said control member for moving said follower along said cam track, a slide supported for engagement by said actuator incident to the raising of the draft linkage to a predetermined elevated position, and a second lever pivoted at one end and adapted when swung about its pivot to engage the other end of said thrust link, and shift said follower along said track in a direction to advance the thrust link, said slide having a portion engageable with the other end of said second lever to swing the lever about its pivot.

24. In a power operating system for a tractor-borne draft linkage, the combination of a pressure fluid operated ram operative to raise or lower the linkage, valve mechanism controlling the supply of pressure fluid to and exhaust of pressure fluid from said ram, a normally closed release valve operative when opened to vent said ram independently of said valve mechanism, a shaft supported for rocking movement, a draft responsive member connected to and operative to rock said shaft, an arm rigid with said shaft operatively connected with said valve mechanism, and a second arm rigid with said shaft operative to open said release valve when said shaft is rocked in one direction to a predetermined limit position.

25. In a power operating system for a tractor-borne draft linkage, the combination of a pressure fluid operated ram operative to raise or lower the linkage, valve mechanism controlling the supply of pressure fluid to and exhaust of pressure fluid from said ram, a normally closed release valve operative when opened to vent said ram independently of said valve mechanism, a shaft supported for rocking movement, a draft responsive member connected to and operative to rock said shaft, an arm rigid with said shaft operatively connected with said valve mechanism, a second arm rigid with said shaft and a push rod supported for endwise sliding movement with one end positioned for engagement by said second arm when rocked in one direction beyond its normal range of travel, said push rod having its other end in operative association with said release valve for operating the valve to open position when engaged by said arm.

26. In a power operated system for a tractor-borne draft linkage, the combination of a pressure fluid operated actuator operative to raise and lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including an elongated member pivotally connected at an intermediate point thereon to said control member, a motion transmitting linkage including a collapsible thrust link connected between said elongated member and said valve mechanism, a plurality of follower elements carried by said elongated member, one adjacent each end thereof, a fixed cam track and an adjustable cam track arranged to be engaged respectively by said follower elements and to cooperate in varying the range of movement of said valve mechanism in response to a given movement of said control member, said fixed cam track having a section to accommodate continued movement of said elongated member after the valve mechanism has been moved to a limit position.

27. In a power operated system for a tractor-borne draft linkage, the combination of a pressure fluid operated actuator operative to raise and lower the linkage, shiftable valve mechanism controlling the supply of pressure fluid to and exhaust of pressure fluid from said actuator, a control member adapted to be displaced progressively in proportion to the draft load imposed on the draft linkage, means for shifting said valve mechanism in response to displacement of said control member including an elongated member, follower elements carried by said elongated member adjacent opposite ends thereof, a tension linkage connected between said elongated member and said control member, means including a thrust link connected between said elongated member and said valve mechanism, tension spring means acting on said elongated member, a fixed cam track and an adjustable cam track positioned to be engaged by the respective follower elements and operative to vary the range of movement of said valve mechanism with respect to movements of said control member in accordance with the adjusted position of said adjustable cam track.

28. In a power operated system for a tractor-borne draft linkage, the combination of a pressure fluid operated actuator operative to raise and lower the linkage, shiftable valve mechanism controlling the supply of pressure fluid and exhaust of pressure fluid from said actuator, a control member adapted to be displaced progressively in proportion to the draft load imposed on the draft linkage, means for shifting said valve mechanism in response to displacement of said control member including an elongated member pivotally connected at an intermediate point thereon to said control member, a collapsible thrust link connected between said elongated member and said valve mechanism, said elongated member having a follower element adjacent each end, a fixed cam track and an adjustable cam track engageable by the respective follower elements, said fixed cam track having a section angularly disposed with respect to the longitudinal axis of said elongated member operative to impart endwise movement thereto when that member is moved transversely by said control member, said adjustable cam track acting to vary the range of such endwise movement of the elongated member in response to given movements of said control member and thereby provide adjustable sensitivity control, said thrust link being operative to transmit the endwise movements of said elongated member to said valve mechanism.

29. In a power operated system for a tractor-borne draft linkage, the combination of a pressure fluid operated actuator operative to raise and lower the linkage, shiftable valve mechanism controlling the supply of pressure fluid and exhaust of pressure fluid from said actuator, a control member adapted to be displaced progressively in proportion to the draft load imposed on the draft linkage, means for shifting said valve mechanism in response to displacement of said control member including an elongated control link supported for longitudinal and transverse movement and operatively connected to said valve mechanism and to said control member, adjustable guide means for said control link arranged to vary the relative longitudinal and transverse movements of the link in accordance with the adjustment of the guide means whereby to vary the range of movement of the valve mechanism for a given movement of said control member.

30. In a power operated system for a tractor-borne draft linkage, the combination of a pressure fluid operated actuator operative to raise and lower the linkage, shiftable valve mechanism controlling the supply of pressure fluid and exhaust of pressure fluid from said actuator, a control member adapted to be displaced progressively in proportion to the draft load imposed on the draft linkage, means for shifting said valve mechanism in response to displacement of said control member including an elongated differential control link operatively connected to said control member for movement thereby transversely of its longitudinal axis, a thrust link connected to said control link and to said valve mechanism, adjustable guide means for said differential control link operative to vary the relative endwise movement of the control link in response to transverse movement of the same by said control member, said longitudinal movements of the control link being transmitted through said thrust link to said valve mechanism.

31. In a power operated system for a tractor-borne draft linkage, the combination of a pressure fluid operated actuator operative to raise and lower the linkage, shiftable valve mechanism controlling the supply of pressure fluid and exhaust of pressure fluid from said actuator, a control member adapted to be displaced progressively in proportion to the draft load imposed on the draft linkage, means for shifting said valve mechanism in response to displacement of said control member including an elongated differential control link operatively connected to said control member for movement thereby transversely of its longitudinal axis, a thrust link connected to said control link so as to transmit longitudinal movements of the control link to said valve mechanism, a plurality of guide means for said differential control link, one of said guide means acting to impart longitudinal movement to the control link in response to its transverse movement, the other of said guide means being adjustable to vary the degree of endwise movement of the control link in response to a given transverse movement of the same, said one guide means being formed to accommodate continued transverse movement of said control link after the valve mechanism has been moved to a limit position.

32. In a power operated system for a tractor-borne draft linkage, the combination of a pressure fluid operated actuator operative to raise and lower the linkage, shiftable valve mechanism controlling the supply of pressure fluid and exhaust of pressure fluid from said actuator, a control member adapted to be displaced progressively in proportion to the draft load imposed on the draft linkage, means for shifting said valve mechanism in response to displacement of said control member including an elongated member pivotally connected at an intermediate point to said control member, a plurality of follower elements on said elongated member, a fixed cam track and an adjustable cam track engageable by the respective follower elements and adapted to cooperate to impart varying degrees of endwise movement to the elongated member in response to a given transverse movement of the same by said control member, and means interposed between said elongated member and said valve mechanism for transmitting the endwise movements of the elongated member to the valve mechanism.

33. Mechanism for transmitting the movements of one control member proportionally to a second control member comprising, in combination, a longitudinally collapsible thrust link normally yieldably maintained in an extended condition, said link having a connection with said one control member for movement therewith transversely of its longitudinal axis and having a connection adjacent one end with said second control member, a cam follower adjacent the other end of said link, means defining a cam engageable by said follower, said cam having a first section positioned to impart endwise movement to the thrust member for moving said second control member or for effecting collapse of the thrust member at a predetermined rate when the second control member is restrained against movement, said cam having a second section engageable by said follower upon movement beyond its normal range, the second section of said cam having a generated face operative to effect collapse of said thrust link at a reduced rate.

34. Mechanism for transmitting the movements of one control member proportionally to a second control member of limited operating range comprising, in combination, an assembly including an elongated member and a collapsible member, said elongated member being operatively connected to said one control member to be moved thereby, guide means having a portion engageable by said assembly and positioned to impart longitudinal motion to said elongated member responsive to movement of said one control member, said collapsible member being connected between said elongated member and said second control member so as to effect proportionate movement of the latter responsive to longitudinal movement of the elongated member throughout the normal range of movement of said second member and to absorb longitudinal movement of the elongated member tending to produce excessive movement of said second control member, said guide means having a second portion engageable by said assembly and operative to partially disable the effect on said second control member of longitudinal movement of said elongated member beyond the range of movement of said second control member.

35. Mechanism for transmitting the movements of one control member proportionally to a second control member comprising, in combination, an assembly including an elongated rigid member and a collapsible member, said rigid member having a connection to said one control member for movement therewith transversely of its longitudinal axis and a connection through said collapsible member to said second control member, guide means having a portion engageable by said assembly to impart endwise motion to said rigid member for moving said second control member or for effecting collapse of said collapsible member when said second control member is restrained against movement, said guide means having a second portion engageable by said assembly upon movement beyond its normal range for effecting collapse of said collapsible member at a reduced rate.

References Cited in the file of this patent

UNITED STATES PATENTS

| | | |
|---|---|---|
| 855,773 | Hanson | June 4, 1907 |
| 1,189,963 | Jones | July 4, 1916 |
| 2,118,180 | Ferguson | May 24, 1938 |
| 2,165,985 | Schwentler | July 11, 1939 |
| 2,356,231 | Ferguson | Aug. 22, 1944 |
| 2,363,292 | Brown | Nov. 21, 1944 |
| 2,448,355 | Cisski | Aug. 31, 1948 |
| 2,460,847 | Schwarz | Feb. 8, 1949 |
| 2,521,503 | Clark | Sept. 5, 1950 |
| 2,587,182 | Livers | Feb. 26, 1952 |
| 2,591,492 | Anderson et al. | Apr. 1, 1952 |
| 2,602,662 | Kintzinger | July 8, 1952 |
| 2,611,306 | Strehlow et al. | Sept. 23, 1952 |
| 2,611,307 | Strehlow et al. | Sept. 23, 1952 |
| 2,631,515 | McRae | Mar. 17, 1953 |